Feb. 13, 1973     T. V. LOEFFLER     3,716,127
COMPOUND MOTION EGG CHANNELING DEVICE
Filed June 30, 1971
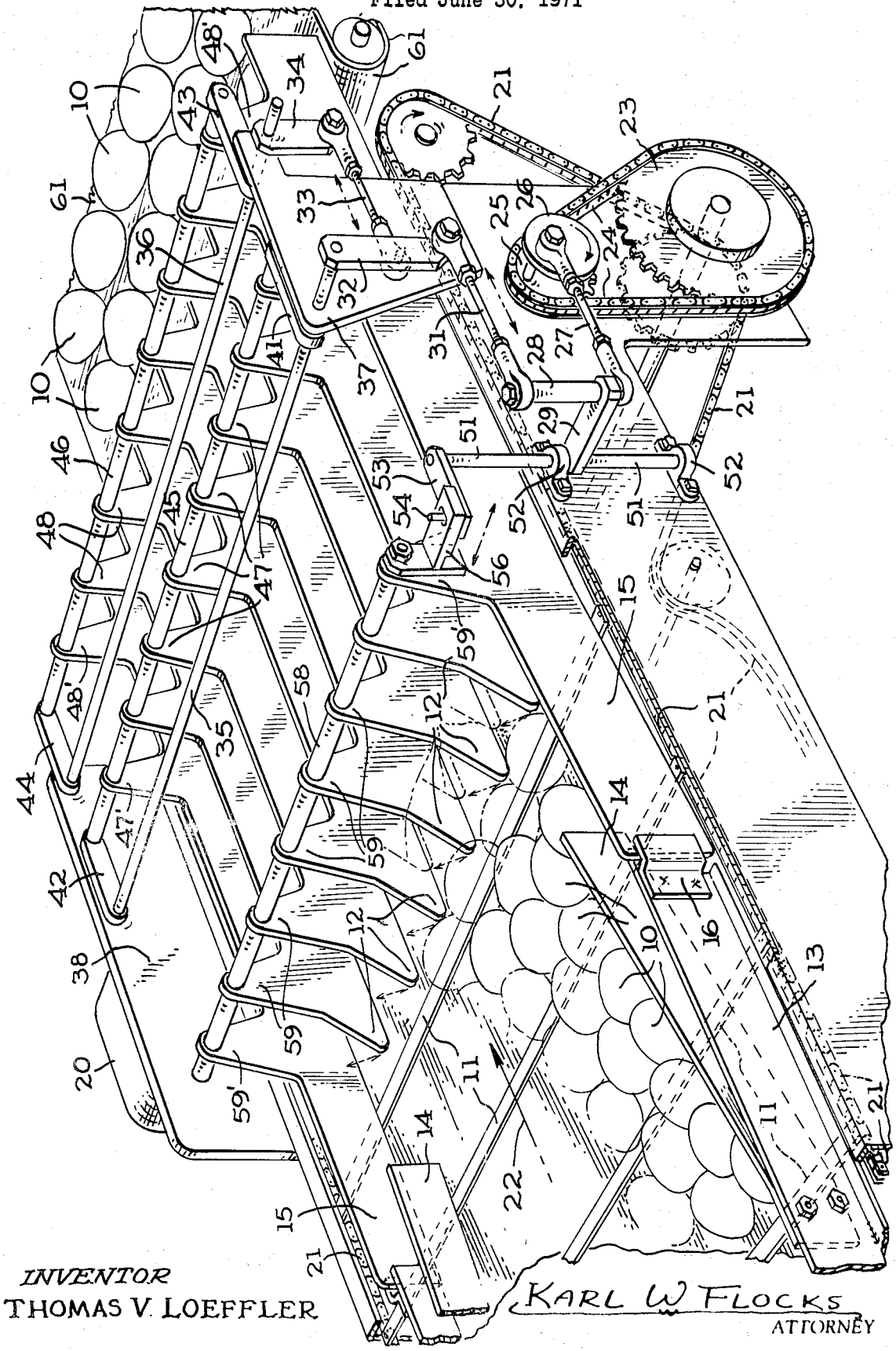
INVENTOR
THOMAS V. LOEFFLER
KARL W FLOCKS
ATTORNEY

United States Patent Office 3,716,127
Patented Feb. 13, 1973

3,716,127
COMPOUND MOTION EGG CHANNELING DEVICE
Thomas V. Loeffler, Northville, Mich., assignor to Diamond International Corporation, New York, N.Y.
Filed June 30, 1971, Ser. No. 158,415
Int. Cl. B65g 47/26
U.S. Cl. 198—30          9 Claims

ABSTRACT OF THE DISCLOSURE

An egg channeling device for aligning eggs passing therethrough from a reservoir into an arrangement in rows, having flexible dividers which are moved by levers and connecting rods in both a vertical and a transverse direction thereby causing a compound movement in a sideward-upward direction of the plurality of dividers. End wall dividers on opposite sides of the conveyor are flexible enough to move along with the other dividers and still have a forward end contained by a bracket attached to the railing of the conveyor reservoir.

BACKGROUND OF THE INVENTION

The present invention deals with a means to receive articles massed in a reservoir and align these articles in a plurality of rows and in particular refers to apparatus receiving eggs from a reservoir of such eggs and funneling these eggs though an oscillating device which places them into rows to be carried on a conveyor for further processing.

In the processing of eggs and in the automation of this system cross collection belts bring eggs from the layer houses and by means of an infeed belt move these eggs into a reservoir. From the reservoir these eggs must be moved to washers and other further processing and for this further processing they are arranged in rows and moved onto spool conveyors which keep them in these rows. It is preferable during this alignment procedure that the minimum of handling of the eggs takes place since excessive handling has been found to be a major cause of cracking and checking of eggs.

SUMMARY OF THE INVENTION

It is an object of the present invention to channel a mass of eggs or similar articles, flowing in a random pattern on an open belt, into a series of single files.

It is a further object of the present invention to do this channeling with a minimum of handling and in a manner to give an operator more time to remove and replace cracks, checks and leakers before they get onto the spool conveyors.

A still further object of the present invention is to keep the eggs flowing with a minimum of resistance and therefore with a minimum of damage to the eggs.

A still further object of the present invention is to dislodge the self locking action of the eggs when massed in the reservoir and ease aligning of the eggs with neither a minimum of empty spaces nor overcrowding on the following conveyor system.

Basically, the present invention is a device comprising a plurality of dividers moved with a compound motion as the eggs or similar articles are funneled through the divider system.

BRIEF DESCRIPTION OF THE DRAWING

The above as well as further objects and advantages which are inherent in the invention will become apparent from the following description of the single preferred embodiment of the invention taken together with the accompanying drawing wherein the sole figure is a perspective view of the device of the present invention.

DESCRIPTION OF THE PREFERRED EMBODIMENT

Referring to the drawing of the present invention, there is shown a mass of eggs 10 being moved from a reservoir by means of slats 11 toward the row dividers 12. Eggs 10 are prevented from falling from the reservoir by means of outer rails 13 and are guided toward the row dividers by inner rails 14. The outer rows of eggs are formed between outer row dividers 12 and end wall dividers 15. All of row dividers 12 and end wall dividers 15 are subject to an oscillating motion which is the combined vertical and transverse motion through which dividers 12 and 15 are moved by mechanism illustrated and described below.

Row dividers 12 and end wall dividers 15 are of a flexible material which may also be transparent. The forward end of end wall dividers 15 on each side is fitted into a bracket 16 which is attached to outer rail 13. Because of this attachment as shown in the drawing it is readily seen why end wall divider 15 must be of a flexible material. The forward ends of row dividers 12 preferably have a downward inclined shape toward the forward end in order to enable the dividers to move under and upward for more effective dislodging of jammed eggs or similar articles. A drive motor for the apparatus is mounted in casing 20 shown in the drawing on the far side of the apparatus. By means of a shaft and sprockets mounted thereon hidden from view the drive motor will operate the movement of chain 21 upon which slats 11 are mounted, thereby causing slats 11 to move in the direction shown by arrow 22.

Also mounted so as to be rotated through the action of drive motor 20 is drive sprocket 23 which drives sprocket chain 24 which rotates driven sprocket 25. Eccentric 26 is mounted on driven sprocket 25 so as to rotate with said sprocket and thereby reciprocate crank 27 as eccentric 26 rotates. A connecting pin 28 passes through an opening in horizontal connecting lever 29 and is rigidly attached at one of its ends to crank 27 and at its opposite end to reciprocating arm 31. The opposite end of reciprocating arm 31 is pivotally connected to an end of vertical connecting lever 32 which in turn is pivotally connected at an intermediate point thereon to a second reciprocating arm 33, at one end of arm 33, with the opposite end of arm 33 pivotally connected to a lower end of a second connecting lever 34. Vertical connecting levers 32 and 34, respectively, are rigidly connected at their upper ends to transverse shafts 35 and 36, respectively, which shafts are supported at their opposite ends by supporting walls 37 and 38. Levers 41 and 42 are rigidly connected to transverse shaft 35 at the opposite extremities thereof but within the supporting walls 37 and 38. In a like manner levers 43 and 44 are rigidly connected to transverse shaft 36. Levers 41 and 42 have their opposite ends pivotally connected to transverse shaft 45 and levers 43 and 44 have their opposite ends pivotally connected to transverse shaft 46, respectively. An ear portion 47 from each of row dividers 12 is connected to transverse shaft 45 by means of the shaft 45 passing through an opening in said ear portion 47. In a like manner transverse shaft 46 passes through an opening in an ear portion 48 on each of row dividers 12. In a similar manner an ear portion 47' and an ear portion 48' from each of end wall dividers 15 are also respectively connected to transverse shafts 45 and 46. Spacers on shafts 45 and 46 between ear portions are used to maintain the spacing between dividers.

Horizontal connecting lever 29 which is pivotally connected to connecting pin 28 and thereby moved by crank 26 has its opposite end from its pivotal connection to connecting pin 28 rigidly connected to vertical rod 51 which is supported in brackets 52. Supported on the top end of vertical rod 51 is horizontal lever 53 with one end rigidly attached to vertical rod 51 and the opposite end having a vertical pin 54 extending upwardly therefrom. Vertical pin 54 extends through a groove in the side of a T-shaped plate 56 which gives the appearance of a T placed on its side with the cross piece in a vertical position. The top portion of the vertical part of the T-shaped plate is rigidly connected to the end of transverse shaft 58. Ear portions 59 of row dividers 12 and ear portions 59′ of end wall dividers 15 have openings therethrough at their upper portions to receive transverse shaft 58 which passes through said openings. The ear portions 59 and 59′ are maintained in their relative spacing to each other by the use of spacers on shaft 58 as previously described in relation to shafts 45 and 46.

OPERATION

In the operation of the machine the drive motor in casing 20 by means of sprockets mounted on its shaft and through the movement of chain 21 connected thereto moves the slats 11 thereby moving eggs 10 toward the row dividers 12. Drive sprocket 23 also being operated through shaft connections to the drive motor in casing 20 rotates, and moves sprocket chain 24 which in turn rotates driven sprocket 25. Eccentric 26 is thereby rotated through its connection with driven sprocket 25 thereby causing crank 27 to move in a generally reciprocating manner. This generally reciprocating motion of crank 27 causes the movement of connecting pin 28 and the reciprocating motion in a similar direction to crank 27, of reciprocating arm 31. Vertical connecting lever 32 pivotally connected to reciprocating arm 31 is thereby rotated about its rigid connection to transverse shaft 35 causing the pivoting of levers 41 and 42 about transverse shaft 35 in a manner so as to cause the raising and lowering of transverse shaft 45 which is pivotally connected at the opposite ends of levers 41 and 42 from their rigid connection to transverse shaft 35. In a similar manner the reciprocating motion of the second reciprocating arm 33 which is pivotally connected to vertical connecting lever 32, causes the second vertical connecting lever 34 to also pivot about its rigid connection to transverse shaft 36 and thereby cause the pivoting of levers 43 and 44 about transverse shaft 36. This pivotal motion of levers 43 and 44 causes the raising and lowering of transverse shaft 46 in a manner similar to that of transverse shaft 45. Row dividers 12 and end wall dividers 15 connected by ear portions 47 and 48 and 47′ and 48′ respectively to the transverse shafts 45 and 46 are thereby raised and lowered in accordance with the movement of the mechanism as described.

Simultaneous with the above motion, the movement of crank 27 in its substantially reciprocating manner causes horizontal connecting lever 29 through its connection to crank 27 by means of connecting pin 28, to pivot about vertical rod 51 to which it is rigidly connected. Vertical rod 51 which is rotated due to the movement of horizontal lever 29 causes horizontal lever 53 to pivot about its rigid connection to vertical rod 51 and thus causes a reciprocal motion of the horizontal portion of T-shaped plate 56 and of transverse shaft 58 attached to plate 56. The forward parts of row dividers 12 and end wall dividers 15 by means of their connection to transverse shaft 58 through ear portions 59 and 59′ respectively are caused to oscillate transversely. But due to the vertical motion of the transverse shaft connected to other ear portions as described above the motions of row dividers 12 and end wall dividers 15 is a compound motion involving vertical and horizontal transverse components. It should be noted that the horizontal transverse components are only applied at the forward end of row dividers 12 and toward the forward ends of end wall dividers 15. This involves a bending motion of all dividers 12 and 15 between their forward and back portions in addition to the bending that takes place in end wall dividers 15 between the connection to transverse shaft 58 and the connection to bracket 16. Therefore, all dividers 12 and 15 must have some flexibility in order to be able to perform as described.

After the eggs or similar articles have passed between row dividers 12 and end wall dividers 15 they are moved onto another conveyor 61 which may be a spool-type conveyor ordinarily used with eggs and which will maintain them in their single file or may be some other similar type conveyor which also would maintain eggs or similar type articles in the file arrangement which they now possess after passing through the device of the present invention.

It will be obvious to those skilled in the art that various changes may be made without departing from the scope of the invention and the invention is not to be considered limited to what is shown in the drawings and described in the specification.

What is claimed is:

1. An egg channeling device for aligning eggs into files received in mass from a reservoir comprising:
   means to convey the eggs from the reservoir and through the channeling device,
   row dividers in the path of the eggs extending parallel to the path of eggs, and
   means to move said dividers with a compound movement having simultaneous vertical and transverse vectoral components.

2. The egg channeling device of claim 1, further characterized by
   said dividers being of flexible material, and
   said transverse vectoral component being applied only at the forward ends of said dividers.

3. The egg channeling device of claim 2, further characterized by
   outer rails along the reservoir,
   said dividers including
      a pair of end wall dividers on opposite sides of the remaining dividers extending forwardly of the remaining dividers, and
      the forward end of said end wall dividers connected to said outer rails.

4. The egg channeling device of claim 3, further characterized by
   an inner guide rail extending inwardly from each of said outer rails and past the connection of said outer rails with said forward end of said end wall dividers.

5. The egg channeling device of claim 2, further characterized by
   said means to move said dividers including
      drive means,
      an eccentric connected to rotate with said drive means,
      a crank arm rotatably connected to said eccentric,
      a connecting pin rigidly connected to said crank arm,
      means to provide said vertical vectoral component connected to said connecting pin, and
      means to provide said transverse vectoral component connected to said connecting pin.

6. The egg channeling device of claim 5, further characterized by
   said means to provide said vertical vectoral component including
      a reciprocating arm rigidly connected to said connecting pin,
      a connecting lever pivotally connected to said reciprocating arm,
      a transverse supported shaft rigidly connected to said connecting lever,
      lifting lever means rigidly connected to said transverse supported shaft, a second transverse shaft supported by said lifting lever means and pivotally connected thereto, and said second transverse shaft connected to support said dividers.

7. The egg channeling device of claim 6, further characterized by said means to provide said vertical vectoral component including a second reciprocating arm pivotally connected to said connecting lever, a second connecting lever pivotally connected to said second reciprocating arm, a third transverse supported shaft rigidly connected to said second connecting lever, second lifting lever means rigidly connected to said third transverse supported shaft, a fourth transverse shaft supported by said second lifting lever means and pivotally connected thereto, and said fourth transverse shaft also connected to support said dividers.

8. The egg channeling device of claim 5, further characterized by said means to provide said transverse vectoral component including a third connecting lever pivotally connected to said connecting pin, a rod rigidly connected to said third connecting lever in a direction perpendicular to said third lever, a fourth connecting lever rigidly connected to said rod, plate means connected to said fourth connecting lever allowing sliding action therewith, and a fifth transverse shaft rigidly connected to said plate means, said fifth transverse shaft connected to support said dividers.

9. The egg channeling device of claim 1, further characterized by said dividers being of a transparent material.

References Cited

UNITED STATES PATENTS

| | | | |
|---|---|---|---|
| 791,243 | 5/1905 | Carlson | 198—30 |
| 3,613,860 | 10/1971 | Waite | 198—30 |

RICHARD E. AEGERTER, Primary Examiner